United States Patent
Berentey et al.

(10) Patent No.: US 11,201,931 B1
(45) Date of Patent: Dec. 14, 2021

(54) MANAGING SOCIAL EQUITY IN A PORTAL PLATFORM

(71) Applicant: Liferay, Inc., Diamond Bar, CA (US)

(72) Inventors: Zsolt Berentey, Budapest (HU); Brian Wing Shun Chan, Diamond Bar, CA (US)

(73) Assignee: Liferay, Inc., Diamond Bar, CA (US)

( * ) Notice: Subject to any disclaimer, the term of this patent is extended or adjusted under 35 U.S.C. 154(b) by 0 days.

(21) Appl. No.: 16/030,804

(22) Filed: Jul. 9, 2018

Related U.S. Application Data

(63) Continuation of application No. 15/091,521, filed on Apr. 5, 2016, now Pat. No. 10,021,201, which is a continuation of application No. 13/829,828, filed on Mar. 14, 2013, now Pat. No. 9,307,035.

(60) Provisional application No. 61/610,878, filed on Mar. 14, 2012.

(51) Int. Cl.
| | |
|---|---|
| *G06F 15/16* | (2006.01) |
| *H04L 29/08* | (2006.01) |
| *H04W 4/21* | (2018.01) |
| *G06Q 10/10* | (2012.01) |

(52) U.S. Cl.
CPC ............ *H04L 67/22* (2013.01); *G06Q 10/10* (2013.01); *H04L 67/02* (2013.01); *H04W 4/21* (2018.02)

(58) Field of Classification Search
CPC .......... H04L 67/22; H04L 67/02; H04W 4/21; G06Q 10/10
USPC ........................................................ 709/204
See application file for complete search history.

(56) References Cited

U.S. PATENT DOCUMENTS

| | | | |
|---|---|---|---|
| 6,984,173 B1* | 1/2006 | Piechowiak | G07F 17/32 463/20 |
| 7,818,372 B1* | 10/2010 | Cutrell | G06Q 10/00 709/204 |
| 8,050,967 B2 | 11/2011 | Bistriceanu et al. | |
| 8,108,255 B1 | 1/2012 | Robinson et al. | |
| 8,312,170 B2* | 11/2012 | Ng | G06F 16/954 709/246 |
| 8,527,596 B2* | 9/2013 | Long | H04L 67/22 709/206 |
| 8,700,648 B2* | 4/2014 | Bhamidipati | G06F 16/9535 707/758 |
| 8,819,009 B2* | 8/2014 | Wana | G06F 16/958 707/734 |
| 8,869,027 B2* | 10/2014 | Louch | G06F 8/60 715/700 |

(Continued)

OTHER PUBLICATIONS

Consumer Reports. "The secret score behind your auto insurance". Aug. 2006. pp. 1-5. (Year: 2006).*

(Continued)

*Primary Examiner* — Imad Hussain
(74) *Attorney, Agent, or Firm* — Aka Chan LLP

(57) ABSTRACT

An administrator can use a portal platform to manage social equity for social collaboration features of the web sites. A goal is to encourage users to contribute to an online community's social activities such as its blogs, message boards, and wiki pages. The portal platform supports social equity features, where users can earn points for their participation. The administrator can specify a counter period, where the points accumulated during the last period are reset. This feature can be used to encourage continual participation by the users.

31 Claims, 10 Drawing Sheets

(56) References Cited

U.S. PATENT DOCUMENTS

| | | | |
|---|---|---|---|
| 9,307,035 B1* | 4/2016 | Berentey | H04L 67/02 |
| 10,021,201 B1* | 7/2018 | Berentey | H04W 4/21 |
| 2003/0233278 A1 | 12/2003 | Marshall | |
| 2004/0238622 A1 | 12/2004 | Freiberg | |
| 2005/0021400 A1 | 1/2005 | Postrel | |
| 2005/0050021 A1* | 3/2005 | Timmons | G06F 16/957 |
| 2005/0138118 A1* | 6/2005 | Banatwala | G06Q 10/10 |
| | | | 709/204 |
| 2006/0004913 A1* | 1/2006 | Chong | G06F 16/958 |
| | | | 709/217 |
| 2006/0031377 A1 | 2/2006 | Ng et al. | |
| 2006/0281510 A1* | 12/2006 | Moreno | A63F 9/18 |
| | | | 463/9 |
| 2007/0112799 A1* | 5/2007 | Bales | G06Q 10/10 |
| 2007/0124688 A1* | 5/2007 | Nauerz | G06F 9/543 |
| | | | 715/746 |
| 2008/0086527 A1* | 4/2008 | Sposetti | G06Q 10/10 |
| | | | 709/204 |
| 2009/0094584 A1* | 4/2009 | Dheap | H04L 67/125 |
| | | | 717/130 |
| 2009/0210392 A1 | 8/2009 | Agranoff et al. | |
| 2009/0217287 A1* | 8/2009 | Blum | G06F 9/44521 |
| | | | 718/105 |
| 2009/0265233 A1* | 10/2009 | Sendo | G06Q 30/0239 |
| | | | 705/14.39 |
| 2009/0313562 A1* | 12/2009 | Appleyard | G01D 4/002 |
| | | | 715/764 |
| 2010/0041468 A1* | 2/2010 | Baerlocher | G07F 17/3274 |
| | | | 463/25 |
| 2010/0241599 A1* | 9/2010 | Yu | G06Q 10/00 |
| | | | 706/20 |
| 2011/0125550 A1* | 5/2011 | Erhart | G10L 15/005 |
| | | | 705/7.29 |
| 2011/0258055 A1* | 10/2011 | Abbott | G06Q 50/01 |
| | | | 705/14.73 |
| 2012/0130809 A1* | 5/2012 | Tedjamulia | G06Q 30/0255 |
| | | | 705/14.53 |
| 2012/0130863 A1* | 5/2012 | Tedjamulia | G06Q 30/0224 |
| | | | 705/27.1 |
| 2012/0143942 A1* | 6/2012 | Chhabra | G06F 16/986 |
| | | | 709/203 |
| 2012/0290565 A1* | 11/2012 | Wana | G06F 16/958 |
| | | | 707/723 |
| 2012/0296733 A1 | 11/2012 | Piros et al. | |
| 2013/0013684 A1* | 1/2013 | Miller | G06Q 10/10 |
| | | | 709/204 |
| 2013/0030887 A1 | 1/2013 | Calman et al. | |
| 2013/0073389 A1 | 3/2013 | Heath | |
| 2013/0091115 A1* | 4/2013 | Brake | G06F 16/951 |
| | | | 707/708 |
| 2017/0330255 A1* | 11/2017 | Tonnison | G06Q 30/0276 |

OTHER PUBLICATIONS

Seguin, Karl. "Practical NoSQL—Solving a Real Problem with MongoDB and Redis". May 8, 2011. pp. 1-4 (Year: 2011).*

Board of Governors of the Federal Reserve System. "Report to the Congress on Credit Scoring and Its Effects on the Availability and Affordability of Credit". Aug. 2007. pp. 1-304. (Year: 2007).*

* cited by examiner

```

Social Activity

# Set the length of the counter period for social activities. The value is
# in a number of days or the special keyword "month" to specify a month.

social.activity.counter.period.length=month

# Enter a list of comma separated values to use in drop down lists in the
# Social Activity portlet.

social.activity.contribution.increments=0,1,2,3,4,5,10,20,50,100
social.activity.contribution.limit.values=0,1,2,3,4,5,10,20
social.activity.participation.increments=0,1,2,3,4,5,10,20,50,100
social.activity.participation.limit.values=0,1,2,3,4,5,10,20
```

Figure 8

MANAGING SOCIAL EQUITY IN A PORTAL PLATFORM

CROSS-REFERENCE TO RELATED APPLICATIONS

This patent application is a divisional of U.S. patent application Ser. No. 15/091,521, filed Apr. 5, 2016, issued as U.S. Pat. No. 10,021,201 on Jul. 10, 2018, which is a continuation of U.S. patent application Ser. No. 13/829,828, filed Mar. 14, 2013, issued as U.S. Pat. No. 9,307,035 on Apr. 5, 2016, which claims the benefit of 61/610,878, filed Mar. 14, 2012. These applications are incorporated by reference along with all other references cited in this application.

BACKGROUND OF THE INVENTION

This invention relates to the field of software and more specifically, to techniques for implementing intranets and extranets.

The Internet and World Wide Web (WWW or the Web) have enjoyed widespread success. The Web is a collection of text documents and other resources, linked by hyperlinks and universal resource locators (URLs), usually accessed by web browsers from web servers. The Web is used daily by people to read news, listen to music, send e-mail, transact business, share information, interact with one another, and much more.

An intranet is a computer network that uses Internet Protocol (IP) technology to securely share any part of an organization's information or network operating system within that organization. It is the connection of computer networks in a local area. An intranet can be understood as a private analog of the Internet, or as a private extension of the Internet confined to an organization.

Intranets can also be contrasted with extranets. While intranets are generally restricted to employees of the organization, extranets may also be accessed by customers, suppliers, or other approved parties. Extranets extend a private network onto the Internet with special provisions for authentication, authorization and accounting.

There is continuing demand for improvements to the Web, so that it is faster, easier to use, encourage participation, more accessible to greater numbers of users, provide more features, and generally address the needs of consumers and customers.

As can be appreciated, there is a need for improved techniques of managing web sites, including intranets and extranets.

BRIEF SUMMARY OF THE INVENTION

An administrator can use a portal platform to manage social equity for social collaboration features of the web sites. A goal is to encourage users to contribute to an online community's social activities such as its blogs, message boards, and wiki pages. The portal platform supports social equity features, where users can earn points for their participation. The administrator can specify a counter period, where the points accumulated during the last period are reset. This feature can be used to encourage continual participation by the users.

In an implementation, the system includes: retrieving a listing of social activity, where the listing includes a actions, each action corresponding to an asset, a type of social equity, and a number of points; extracting assets on a portal web page, where each of the assets correspond to a portlet executing on the portal web page; based on the listing of social activity associating with each asset a type of social equity and a number of points; tracking the assets on the portal web page; detecting a first action by a first user with a first asset on the portal web page; and incrementing in a social equity points database for the first user, a first number of points with a first type.

The method can include after exceeding a threshold, resetting in the social equity points database the points associated with the first user. The method can include before the resetting in the social equity points database, processing from the listing of social activity threshold values for each type of social equity. The threshold can be a length of time or a number of points. The method can include where resetting is to a zero point value or a non-zero point value.

In various implementations, the system includes where the first number of points are visible to the first user. The first number of points can be hidden from the first user. The portal web page can be an enterprise portal. The method can include processing the social equity points database to generate a leaderboard. The system can track various types of actions, such as adding a blog entry associated with a blog portlet, adding a wiki entry associated with a wiki portlet, or adding a message board entry associated with a message board portlet. The system can include where the listing of social activity is inaccessible to the first user.

In an implementation, the system includes: collecting actions from users of a portal web platform; for each action of the actions, determining a corresponding point value and point type from a listing of social activity; storing at a social equity points database, for each user of the users, a point value for each point type; and adjusting values stored in the social equity points database according to the determined corresponding point value and point type.

In implementations, the system includes generating a summary of values in the social equity points database. The method can include where the summary is accessible by the users.

In an implementation, the system includes: collecting actions from users of a portal web platform; for each action of the actions, determining a corresponding point value and point type from a listing of social activity; storing at a social equity points database the determined point value by point type; adjusting values stored in the social equity points database according to the determined corresponding point value and point type; and resetting the values stored in the social equity points database.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 8 shows a property settings screen where a portal administrator can adjust social equity attributes of a site managed by the portal system.

DETAILED DESCRIPTION OF THE INVENTION

Figure 1:
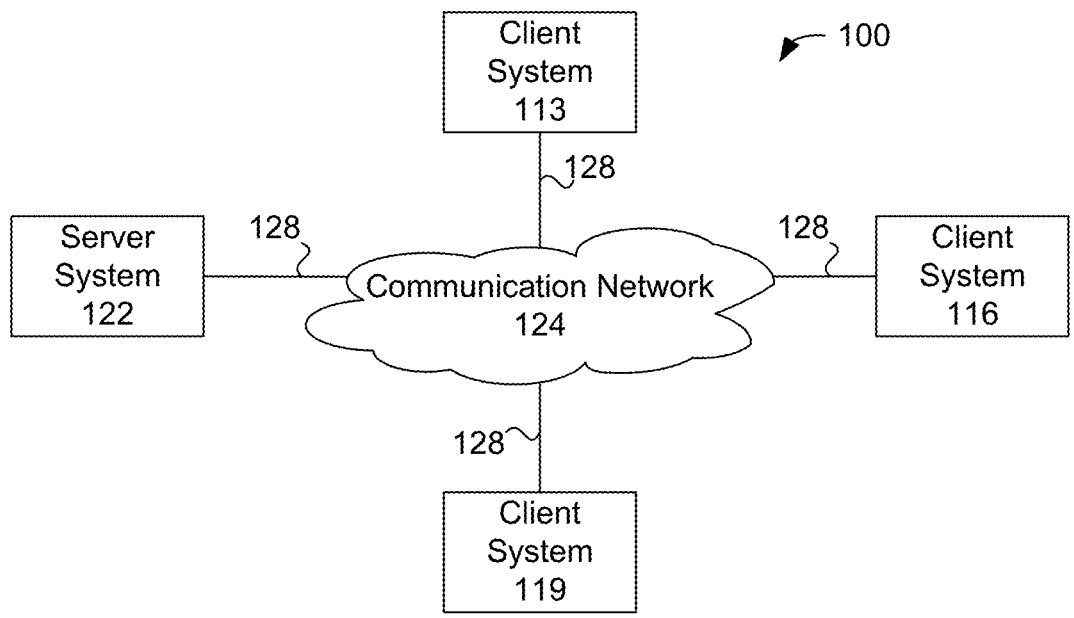
FIG. 1 shows a simplified block diagram of a distributed computing network connecting a server and clients.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

Figure 2:
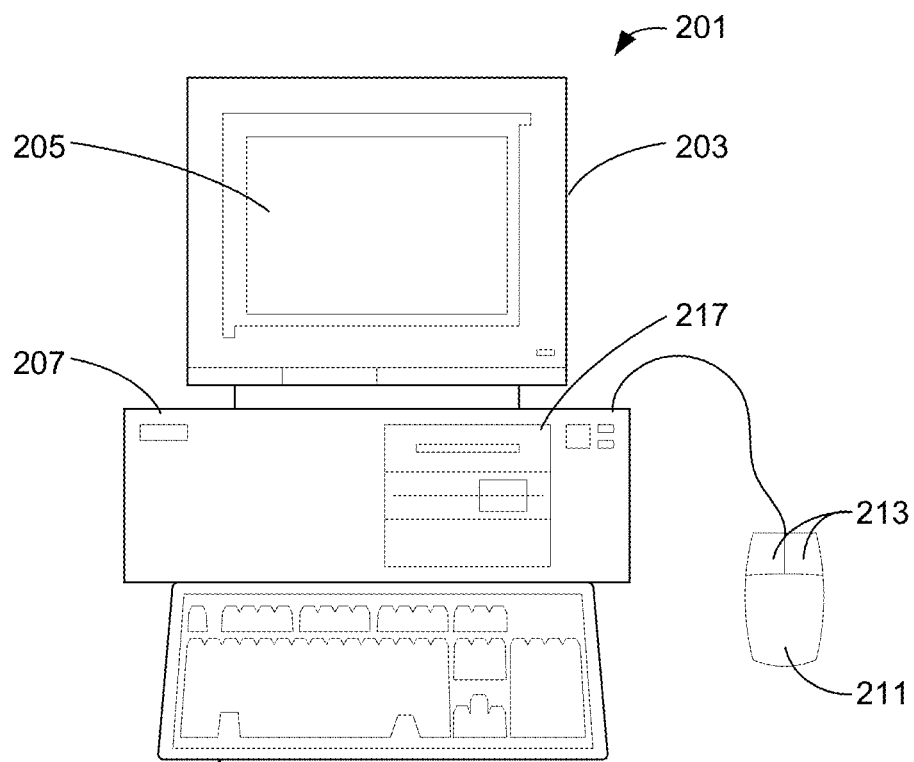
FIG. 2 shows a more detailed diagram of an exemplary client of the system.

FIG. 2 shows an exemplary client system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
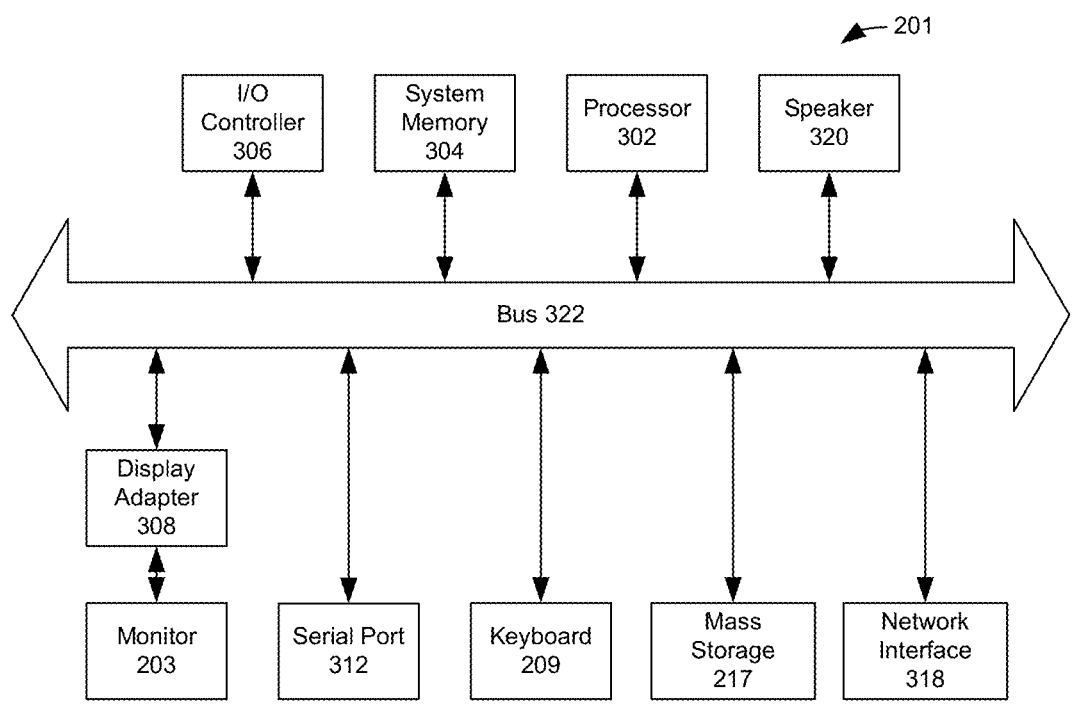
FIG. 3 shows a system block diagram of a client computer system used to execute application programs such as a web browser for the system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows, 8, Windows CE, Windows Mobile), Linux, HP-UX, UNIX, Sun OS, Solaris, Mac OS X, Apple iOS, Google Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples), near field communication (NFC), radio-frequency identification (RFID), mobile or cellular wireless (e.g., 2G, 3G, 4G, 3GPP LTE, WiMAX, LTE, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

A portal platform is generally a software platform for building web sites and web applications. Some specific example of portal platform software includes the Liferay Portal, Liferay Social Office, Liferay Sync, and Liferay Projects by Liferay, Inc. See www.liferay.com for more information. All public published content by Liferay to the filing date of this patent application is incorporated by reference along with all other cited references in this application. This published content includes web site pages, user guides and manuals, white papers, and other online and paper publications and documentation.

The system can include, for example, Liferay Portal releases 6.1, 6.0, 4.2, and 5.1 Liferay Social Office release 1.5. Documentation for these releases is available at the Liferay web site and are incorporated by reference.

The system includes a portal server. For example, the system's portal server is designed to be a single environment where all of the applications a user needs can run, and these are integrated together in a consistent and systematic way. If an application lives (or executes or resides) outside the portal, the portal should be able to consume some resource of the application (such as an RSS feed or a subset of functionality in a "dashboard" application) so that the end user can see everything he or she interacts with at a glance (e.g., on the portal page without navigating to other pages).

To achieve this, application functionality within the system resides in fragments of the page called portlets. Portlets are web applications that run in a portion of a web page. The system includes a portlet container that aggregates portlets on particular pages and displays them to users. In this way, one or many applications can reside on a page, and users can (at the administrator's discretion) arrange them however they like. For example, the user can modify the position of a portlet with respect to another portal or from one position on the portal page to another position.

Portlet applications, like servlet applications, are defined by a Java standard which various portal server vendors have implemented. The Java standard defines the portlet specification. A JSR-168 or JSR-286 standard portlet should be deployable on any portlet container which supports those standards. Portlets are placed on the page in a certain order by the end user and are served up dynamically by the portal server.

Portal applications generally come in two flavors: (1) multiple portlets which only provide small amounts of functionality individually, but are aggregated by the portal server into a larger application, or (2) whole applications which reside in only one application window. The choice is up to the application designers. This means that developers have to worry about what happens inside the portlet itself. The portal server handles building out the page as it is presented to users.

Portlets are not difficult to build, and Java standard portlets can be written by any Java developer with experience in writing web applications. The system can include a plugins software development kit that assists designing new portlet projects, as well as a development environment based on Eclipse.

The system can include social collaboration features users need to do virtual teamwork. Users can coordinate calendars and schedules, write shared blog entries, work together on documents, discuss issues in forums, document everything in a wiki, and more. The underlying theme is that all discussion and collaboration is kept with the asset. This means that the asset, whether that be a document, a thread, a blog entry, or a wiki article is the star around which all of the discussion and collaboration orbits.

Trying to collaborate on assets through e-mail or server shares works up to a certain point—but then it fails because it is a backwards way of doing the work. The asset in that scenario becomes secondary, and the "wrapper"—e-mail or the share—becomes the primary target of the work. So instead of concentrating on the asset which the team is trying to produce, the focus turns to the wrapper.

In the case of a shared folder, a user might manually rename documents according to a numbering scheme so other users can tell which is the latest—that is, until a user forgets to do so, or until a user accidentally overwrites the latest document. In the case of e-mail, users try to navigate huge threads while passing an asset back and forth—until a user forgets to "reply all" or until a user starts a new thread (and maybe forgets to put the whole list on the thread).

Working in the mediums of shared folders or e-mail puts the focus on working with the wrapper, not the asset. And so what happens is the asset gets lost because they are forced to focus on the wrapper instead of the asset. With the system, users will be free to concentrate on their assets—the system gets out of the way of users so that it's a simple matter for users to work together.

Portals can include a range of functionality and a single portal can include one or more of the functions described following:

Web Platform.

A portal is generally a software platform for building web sites and web applications. Using such a platform, a portal administrator can manage one or more web sites of an organization. In addition to managing external web sites, the portal platform can manage intranets and extranets.

A portal platform can have multiple features that make them appropriate for a wide array of web applications. Some common uses for a portal include: (a) web sites that present different pages depending on a user's login (e.g., whether the user is logged in); (b) web sites that present different depending on the user's role (e.g., role as a customer, employee, or partner); (c) web sites that integrate multiple existing web application (e.g., ERP portal has product alerts, inventory, and sales applications); and (e) web sites that allow groups of individuals to collaborate through applications, on content, or with documents.

A portal platform has tools making it easier for users to build web pages and web sites by assembling portlets or gadgets onto a portal page. Portal web sites combine a theme (e.g., header/footer and common look and feel), a set of pages, navigation (e.g., menu bar), and a set of portlets and gadgets. Administrators can build pages without coding by reusing existing portlets and gadgets.

Portals make it easy to build web sites that show different content depending on whether or not the person is logged in. For example, a bank website may feature a set of pages describing its services, special offers, and contact information that are accessible to all; however, after a customer login, additional content may be available such as account information, bill payment, loans, and so forth.

Portals additionally simplify the development of web sites that display different data depending on a user's role. For instance, a bank website may feature anonymous and authenticated (logged-in) pages but can additionally have different pages available for various customer types. A standard account can have basic services and pages, while business customers can have additional pages defined.

In addition, portals allow end-users to define pages, and add content to their pages using predefined portlets or gadgets. They can also define who can access their pages. Team members can then collaborate together within their community site.

Once it is developed, a web site may be made available in multiple languages and from multiple platforms (e.g., smartphones, tablets, other computing devices). The portal platform provides a method to simplify the development and management of pages for each type of end-user.

Web Content Management System.

A portal can include a full workflow enabled web content management system. Many portal web sites include a great deal of content that requires regular updates. These updates are often accomplished by nontechnical content contributors and need to be approved by content approvers in a workflow approval process.

Portals with web content management can additionally have a workflow approval process to allow some people to edit content, which is approved by others before being published. For example, a web site having an advertisement on the side of the page could add content via a user interface (UI) editor. If changes to the advertisement are desired, a portal content contributor can log in, make the edit, and save the changes. If the individual is not approved to publish content changes without review, the system will route the update to a content approver.

Portals can also serve as a repository for documents. Similar to content, documents can be added to the repository and made available through the web interface or web site. For example, individuals can publish documents into a central repository and have them be made available to portal users in a central library upon their login.

Integration Platform.

Portals can integrate various existing applications into a single unified user experience. Portals enabled enterprises to pull together information and applications into one web site where users based on role would have quick access to all content specific to their role.

Enterprises often have a very large number of web sites and web applications that individual users regularly access. One method to improve the user experience and improve overall user productivity is to aggregate these various existing websites and applications into a single portal.

Integrations may also include external systems. Enterprise resource planning (ERP) systems can be integrated into a portal dashboard, showing status and alerts. Rather than link to each system, a portal would include one or more portlets showing data from the back-end system.

Additionally, portals can integrate various web sites into a single unified website. For example, an enterprise may have an anonymous website, customer website, partner website, and an employee website.

Collaborative Platform.

Portals also allow the development of collaborative websites for teams and an entire enterprise.

Team Collaboration.

The portal ability to allow individuals to create their own communities empowers teams to create a web area and assign a set of collaborative tools (e.g., blog, wiki, calendar, tasks, alerts, doc sharing) to the group. An individual can create or join one or more communities and organize all collaboration within that community.

Organizational Collaboration.

Portals are also capable of supporting an entire enterprise for collaboration. As various collaboration tools are implemented, they can be made available to teams through the portal's modular design capability (e.g., add an additional portlet to the system and make available to community owners). As teams collaborate, they input a wide range of resources that can be leveraged by other teams throughout the enterprise.

Social Collaboration.

Although teams can be formed by formal organizational roles, they can also be formed by informal roles. Portals enable these teams to join together. For example, a team of experts in various areas of a company can "friend" each other and track various projects they are working on individually. Furthermore, they can come together and form their own ad hoc community for a specific project. Social features such as social equity, rating, friending, presence, internal messaging, and friend activity walls allow these informal teams to easily collaborate.

Social Platform.

A portal platform provides tools for building web applications, web sites, and portals, but it can additionally be used for a new category of web applications called "social applications." A social application is a web application that additionally leverages social identity, data, and features or services.

Figure 4:
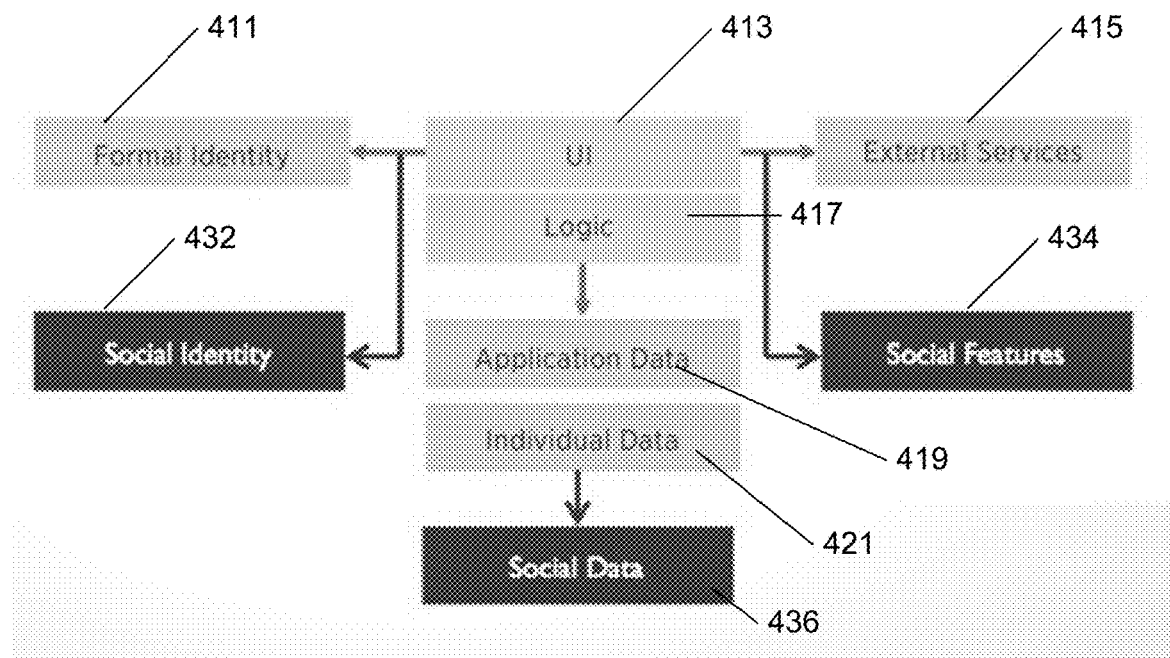
FIG. 4 shows a block diagram of a social applications platform.

FIG. 4 shows a block diagram of a social applications platform. Blocks 411, 413, 415, 417, 419, and 421 represent a definition of a typical web application while the blocks 432, 434, and 436 show the addition of social aspects. First, a standard web application includes a user interface 413 built to access application logic 417. Second, web applications are often influenced by a formal identity policy 411. Third, applications will have access to data that they store 419 or is specific to the current user 421. Lastly, web applications are often built to interface with external services 415 and are built using external systems as part of the business logic.

Nearly any web application can also be built as a social application, increasing the productivity of users. Some features to implement social applications include leveraging social identity by adding it to formal identity, leveraging social data by expanding data scope, leveraging existing social features and services in social applications, a container (e.g., OpenSocial), and centralized social identity repository.

Enterprises often implement an enterprise-wide systems architecture that simplifies access management. Applications are defined to access user identity from a central repository, while Identity Management software is used to update this information. This type of architecture simplifies the management of a large and changing number of users that are accessing an equally large and changing number of applications. It also allows auditing and compliance as all accounts are centrally managed and all access can be centrally audited.

Figure 5:
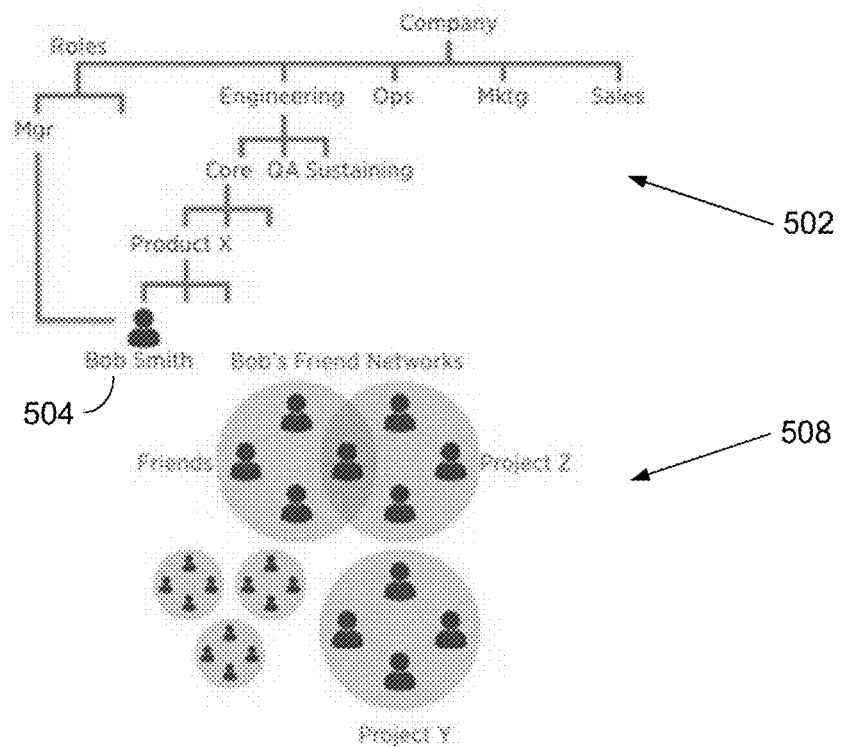
FIG. 5 shows an example of leveraging a social identity by adding it to formal identity.

FIG. 5 shows an example of leveraging a social identity by adding it to formal identity. For example, a social identity is whom a person is connected to, sorted by friendships of projects involved in. On the other hand, a formal identity is related to where the person is in an organization. This can show that the person can be involved in specific projects with an organization, but also where the person and the project stands in relation to others in the organization. In the figure, Bob Smith 504 is identified by both his formal 502 (e.g., represented by an organizational chart) and social identities 508 (e.g., represented by his circle of friends, and degrees of separation by connecting through other friends). He has a formal identity that states his membership in the engineering organization, core engineering team, project X; plus, he has the additional role of manager. This formal identity is defined by policy, implemented by people administrators, and is often regulated by Sarbanes-Oxley Act (or SOX) compliance.

Standard web applications can be developed to leverage a formal identity with several methods (e.g., simple access control, node specific access control, role-based content delivery, or even workflow access). However, users can be identified by more than their formal, defined-from-the-top-down identity—they can also be identified by their social identity. "Social identity" is an individual's self-identified friends and groups or communities.

Figure 6:
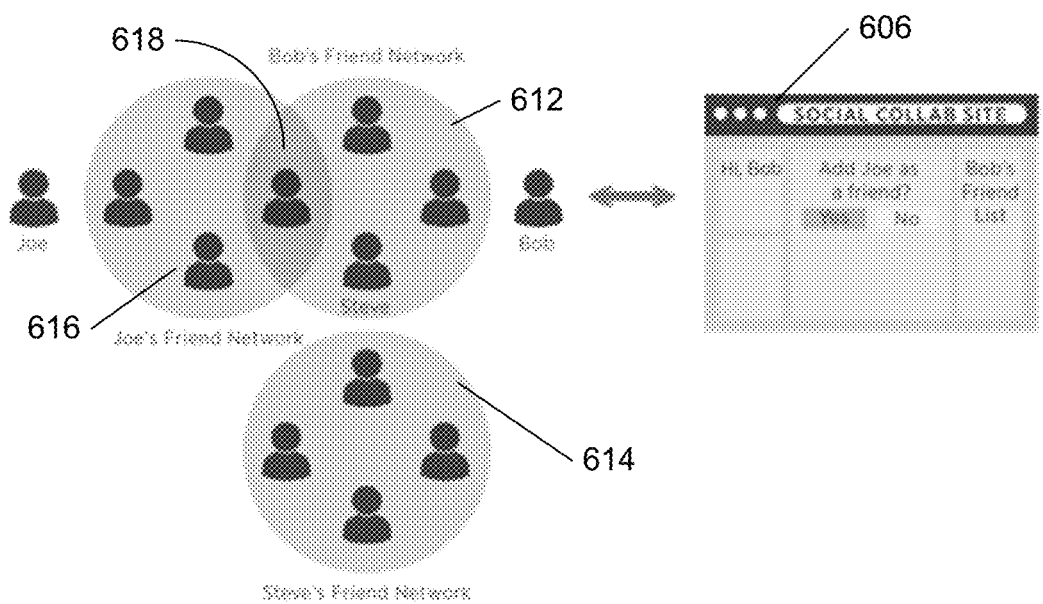
FIG. 6 shows an example of leveraging a person's social identity.

FIG. 6 shows an example of leveraging a person's social identity. Social applications also leverage a person's social identity in several methods (e.g., activity streams, subgrouping, grant access control, restrict access control, delegation, or other methods). In FIG. 6, Bob can access a social collaboration site 606, which knows he has a friend network (612) that is different from Steve's (614) and Joe's (616) friend networks. Activities and applications would be available to others in Bob's friend network if he grants them access (e.g., adding these persons as friends in his social network), in which case all would be permitted to use the applications and content. While the community itself is a social application, applications available in the community can also be social applications depending on their data scope. In this example, Bob's network 612 shares a person 618 with Joe's network 616. Bob's network 612 does not share persons with Steve's network 614.

Figures 7A, 7B:
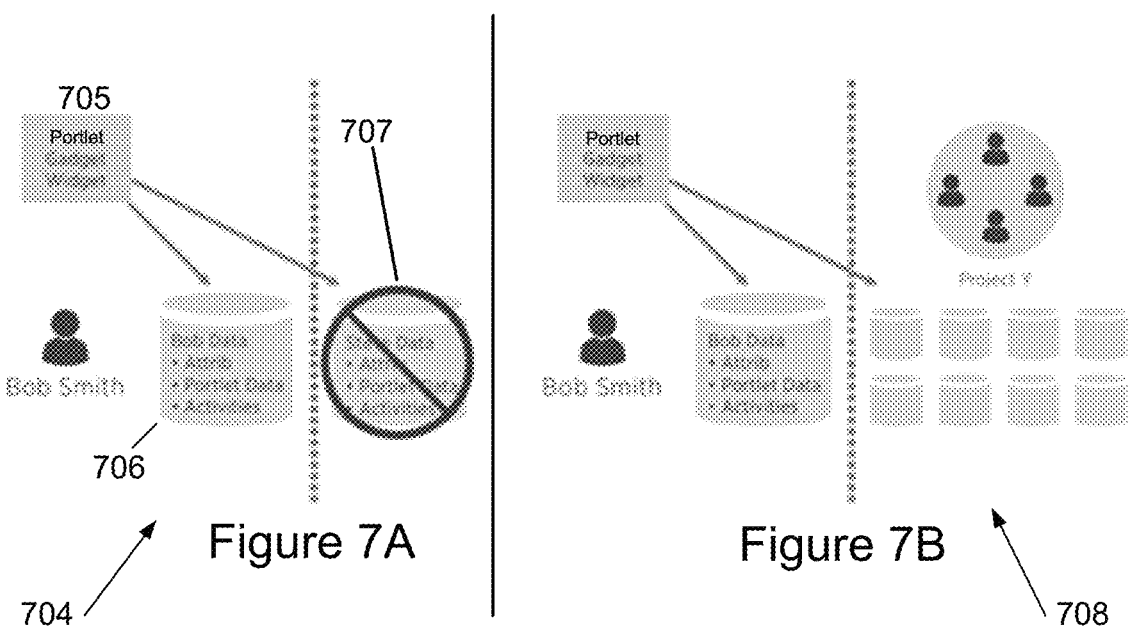
FIGS. 7A and 7B show an example of leveraging social data by expanding data scope.

FIGS. 7A and 7B show an example of leveraging social data by expanding data scope. A social application is often designed to have a data scope that is broader or more restricted based on an individual's social identity. In FIG. 7A, an application 704 is a standard web application. In FIG. 7B, an application 708 represents a social application. The standard web application has application data, but Bob can only see the application data associated with himself. For example, Bob can use portlet gadget widget 705 to access data associated with him in a database 706, including Bob's attributes in the system, portlet data, and activities from Bob. Bob is prevented from accessing data associated with Steve in a database 707.

For example, a calendar application would allow Bob to create events that he can see; however, Bob cannot see Steve's events and vice versa. If Bob is accessing a social application, for example as shown in FIG. 7B, he can see data that is specific to himself as well as information that is specific to all members in project Y. For instance, a team calendar would allow all members to create events and enable individuals to see events created by all members. Expanding data scope allows a self-defined group of individuals to work on an application either as a team or as individuals.

Social applications can be developed using existing social features or services available in a social application platform. For example, a social application could include an existing shared document library, RSS subscription service, or wiki. A platform can provide many applications and features with collaborative capabilities and can be combined into the use case for the application in development. These services can be grouped into categories.

A collaboration services category includes wiki, blog, forums, doc sharing repository, messaging, calendaring, tasks, unified communications, and others. A user services category includes RSS, subscriptions, and alerts; tracebacks; user ratings, equity; presence; and workflow. A portal services category includes aggregation, modular app support, RBAC/RBCD, user personalization, type 1 (layout), type 2 (attributes), delegation, and web content management.

More than simply adding links, each can become a service within a social application. A portal's ability to build an application from a set of modules, where features are grouped into one or more web pages, helps to make the application customizable while simplifying the growth of the application's feature set over time.

Social applications can each implement their own social repository or leverage a centralized repository for social identity. The platform can implement OpenSocial, which specifies both a method to run gadgets and widgets as well as a common method to store and access social identity. This allows enterprises to use the platform as an authoritative source for social identity information. A single platform installation in an enterprise allows users to create a profile page, develop a friend network, create and manage new communities or join other communities. This repository of social data can then be used by other applications installed into the same platform portal.

OpenSocial is a public specification that defines a component hosting environment (container) and a set of common application programming interfaces (APIs) for web-based applications. More information for OpenSocial can be found at www.opensocial.org, and all public published content made available at this web site before the filing date of this patent application is incorporated by reference.

Additionally, because the system can leverage the OpenSocial standard, and because the system externalizes the definition of the friend network, a single platform implementation can be leveraged as the master repository for social networking data. Applications that also support other container standards (e.g., OpenSocial) can point at this platform implementation and leverage its master social identity repository. Enterprises that implement this method will be able to develop a single identity management repository for social data, enabling a single source for collaborative definitions (and auditing).

With a portal platform, a web administrator can add social equity features to the web sites (including for example, intranets and extranets) being managed. Social equity relates to techniques of rewarding users for their contributions in an online community. It is generally desirable for an organization to have its users actively participate in a community, and giving users credit for their contributions. For example, these rewards may include assigning points for actions or particular activities performed by the users.

Using the portal platform, the administrator can select or indicate which activities to reward, how many points to assign to a particular activity, and specify and managed other parameters associated with social equity for users and web sites. Some activities that can be rewarded include: logging in, time spent on the site, contributing to a forum, asking or posting a question, answering a question, maintaining and updating a blog, and others. For a company, by encouraging active participating in the community, employees can get to know each other, share ideas, be more communicative with each other even if at different locations or time zones, and work better together as a team.

In an implementation, the system can also define different types of points, which match the type of activity a user has done. For example, the system can have three types of points: contribution, participation, and popularity. These different types of points capture different aspects of a user's activity. For example, participation points can be given to users who create assets in the portal (e.g., creates a wiki, adds a comment, or actions). Contribution points can be given to users who perform actions on a created asset. For example, users commenting on a blog, updating a blog or other activities can gain additional contribution points. Popularity points can be granted by how often other users access your asset. For example, if user A creates a blog that is regularly viewed by many users, each view can help gain user A additional popularity points.

A single activity can grant the user points in one or more categories and different values for each category. For example, when a user updates a blog, the user can get 1 participation point, 0 contribution points, and 0 popularity points.

The parameters for social activity managed by an administrator can be through a settings screen, selection menu, parameters file, or other interface. For example, the administrator can edit or specific parameters in a social activity parameters file.

FIG. 8 shows a property settings screen where a portal administrator can adjust social equity attributes of a site managed by the portal system. These parameters in a parameters file that the administrator can edit. The administrator can adjust a counter period as well as point increments for contribution and participation values for.

For example, the social.activity.counter.period.length parameter indicates a period or length of time during which social activity is tracked, and then reset. This period can be set to any number (e.g., 15 days, 30 days, month, 60 days, 90 days, or 1 year) the administrator desires. A number can indicate a number of days while a keyword month is used to specify a month period.

A goal of an organization is to encourage users to continually or regularly contribute, even if they might have contributed greatly in the past. The organization does not want users who have accumulated a large number of social equity points to no longer participate (e.g., coast after building up a big lead). Using this social equity counter period, this allows the administrator to reset the social equity points to 0 or other baseline value periodically to continue to encourage people to participate. The person who contributed the most during each period may be recognized, and then a new period beings where each user has a chance to become the new leader.

This also reduces the chance that a user attempts to artificially gain points in the system, at the end of a points period. For example, since the system can limit the amount of points a user gains for a particular time period (e.g., a day, two days, an hour, a week, or other time period), a user that is trying to inflate their points in the system at the end of a certain period (e.g., to meet a certain amount of points before an internal review or other event), is prevented from doing so.

Figure 9:
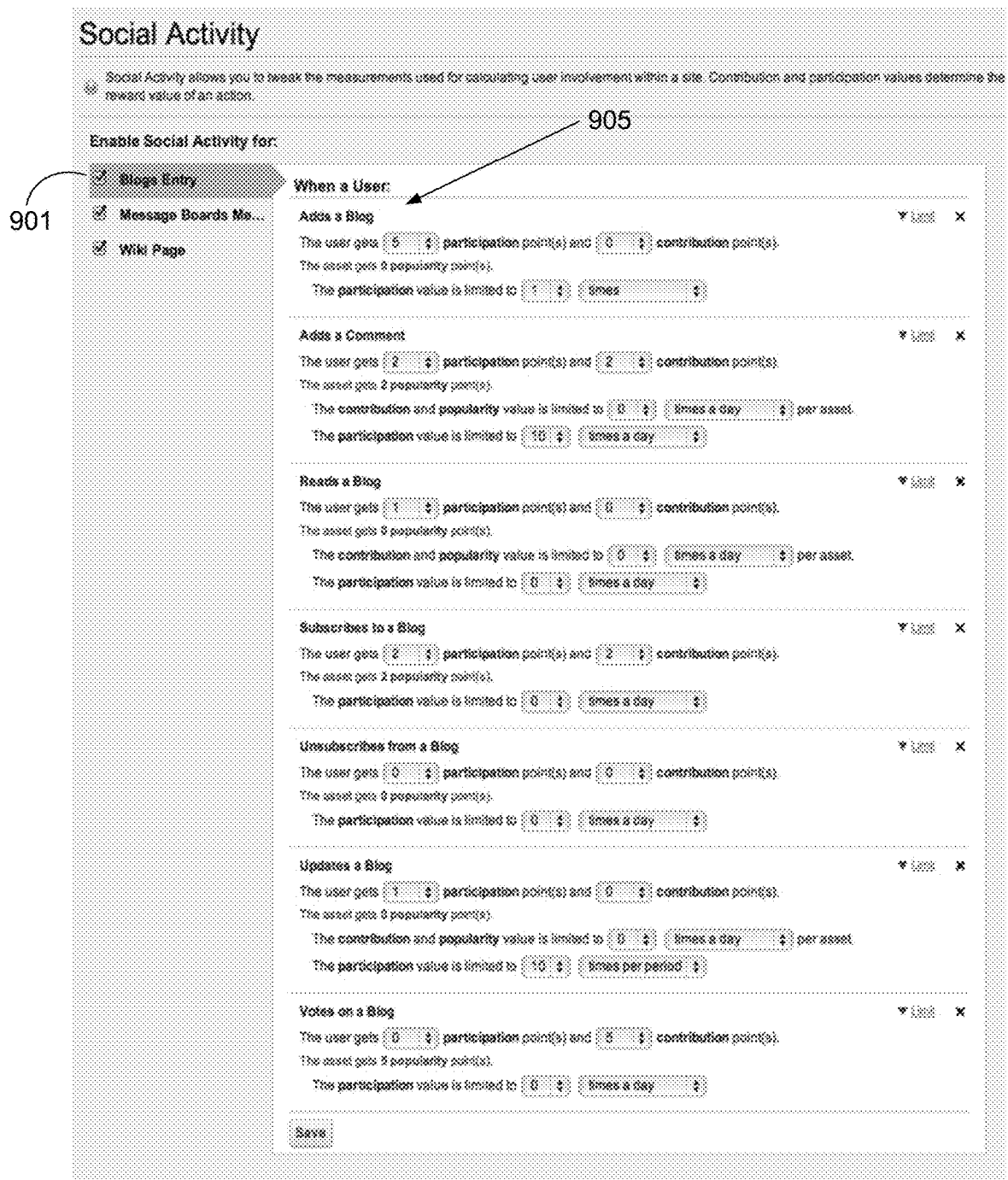
FIG. 9 shows a screen where a portal administrator can enable or disable social activity tracking for a portal site.

FIG. 9 shows a screen where a portal administrator can enable or disable social activity tracking for a portal site. The screen lists some assets (or detected actions) which the administrator can adjust the social equity points for. This screen lists assets for social activity in the blog entry area 901. There are also similar asset pages for message boards and wiki pages, which the administrator can choose by selecting (e.g., using a mouse or other pointer) to the appropriate tab. For blogs entry, the assets include: adds a blog, adds a comment, reads a blog, subscribes to a blog, unsubscribe from a blog; updates a blog, and votes on a blog.

For each asset, there are a number of participate points, contribution points, and popularity points that can be assigned. For example, for adding a blog 905, a user is given X1 participation points and Y1 contribution point. The parameters X1 and Y1 are specified by the administrator by using drop down boxes of the graphical user interface. In this example, 5 is selected for the participation points and 0 for the contribution points.

In an implementation, the system does not allow users to see how many points each activity (or asset completion) results in. This encourages users to engage in the entire system, instead of engaging only in specific assets to gain more points For example, this can be accomplished by a blind points system, where the exact number of points (and the other additional criteria for each point as described elsewhere) is prevented access by the users.

The administrator can also specify a limit for a particular activity, so that after so many points have been accumulated for one activity, the user no longer receives credit for that activity. This serves to encourage users to participate in more than just one activity. The limit can be made to apply for a certain time period, such as time a day or other period of time. The administrator enters information on the social activity screen and selects the save button to save any changes.

Figure 10:
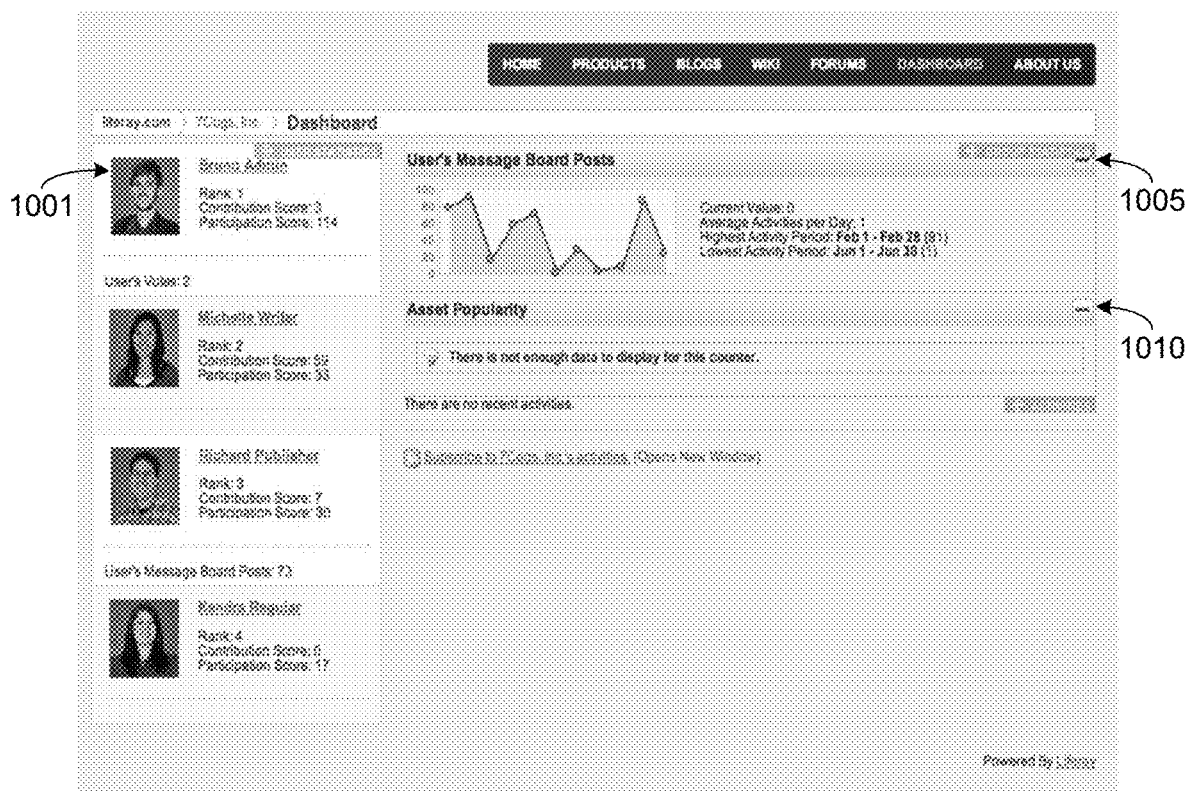
FIG. 10 shows a dashboard screen with including user and group statistics modules which display the reports of user and group activity against both users and assets.

FIG. 10 shows a dashboard screen with including user and group statistics modules which display the reports of user and group activity against both users and assets. The screen lists the top contributors in terms of ranking, and lists their contribution score and participation score. There is a graph of the user's message board posts over time (showing activity varying over time).

Figure 11:
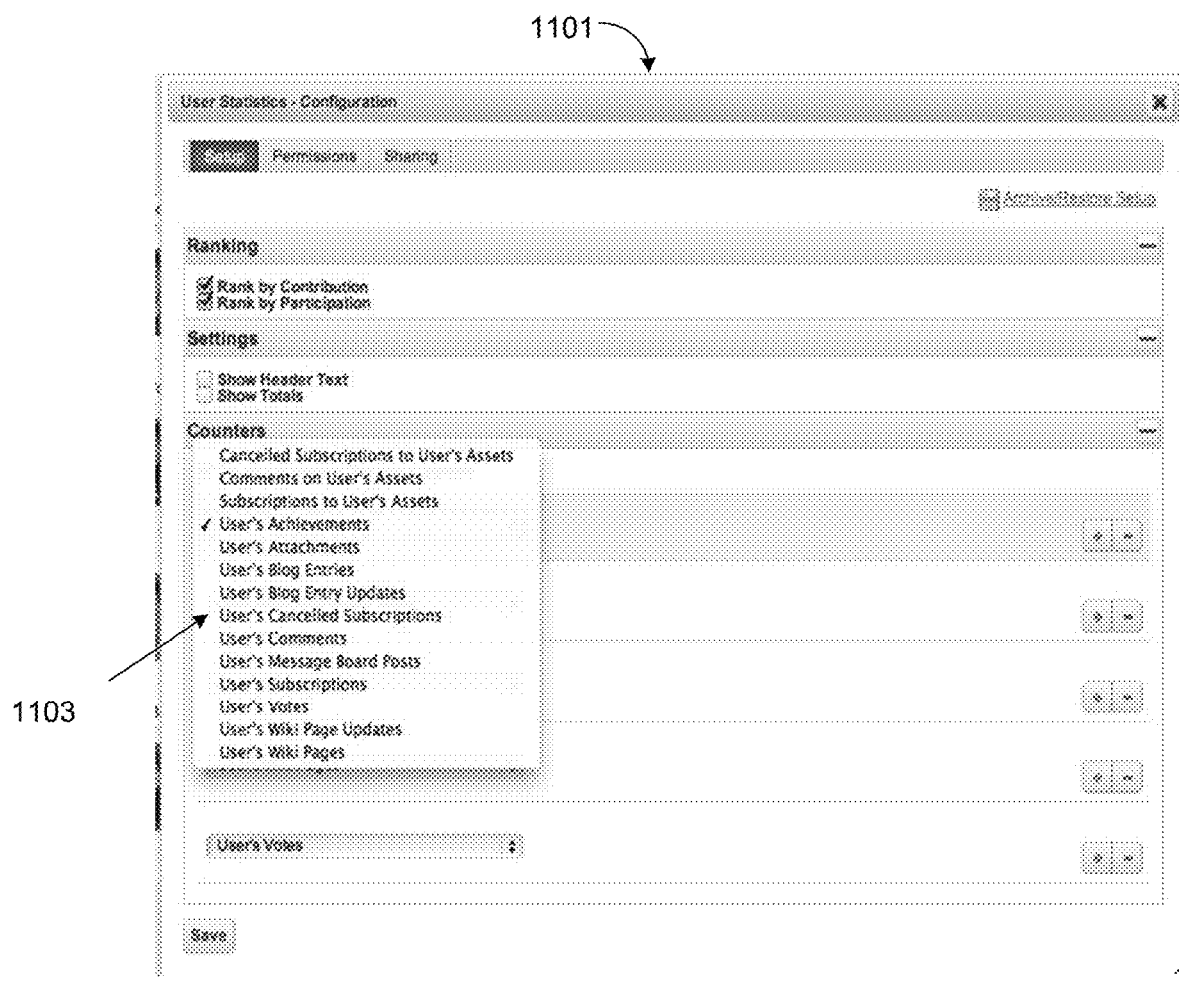
FIG. 11 shows a user statistics screen of the various activities the system can report by user.

FIG. 11 shows a user statistics screen of the various activities the system can report by user. This screen 1101 shows what kind of options can be configured when viewing users of the system. The system is organization by ranking, settings, and counters options. In the counters option, the system can be configured via a drop down menu 1103. For example, the counters option can be set to a user's blog entries. This can include a count of how many blog entries a user has made or what entries the user has been making.

Figure 12:
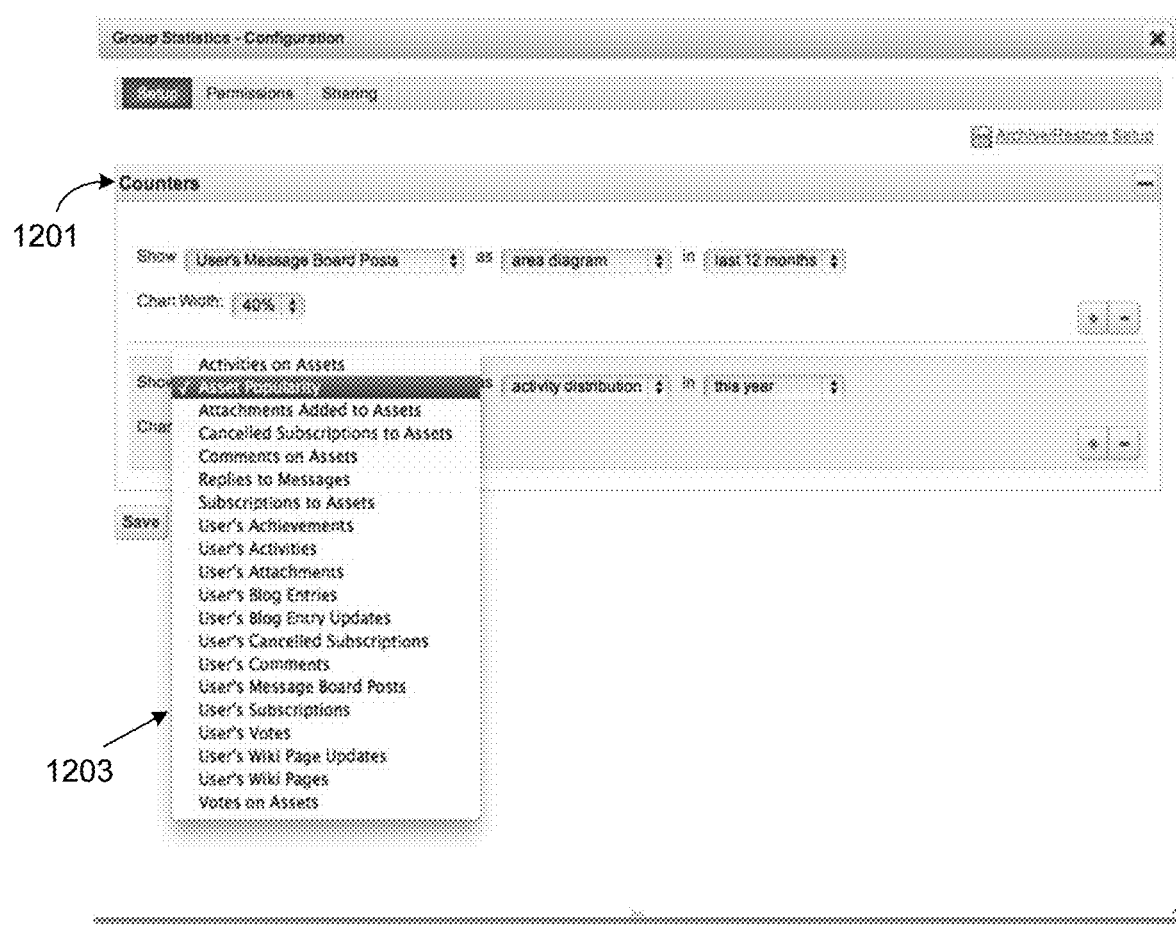
FIG. 12 shows a group statistics screen of the various activities the system can report.

FIG. 12 shows a group statistics screen of the various activities the system can report. This screen provides additional settings related to the counters option. On this screen, a person can view how the system is being used by users of the system. For example, an administrator of the system can use the asset popularity option in drop-down menu 1203, to see how popular a particular asset tracked by the system has been satisfied.

In an implementation, the system can detect user operations with the portal (through an asset or other object) using one or more various methods. This can occur at various stages of the portal operation process. One method is where, when a user interacts with a portlet, the portlet transmits the user's interaction back to the portal where the system determines what points are associated. Another method is where, when a user interacts with a portlet, the portlet transmits the user's interaction to a separate destination, so that the system can assign points associated with the action.

In an implementation, the system rewards different achievements, badges, pins, rewards, symbols, medallions, markers, or other classifications depending on their points in the system. For example, a user that contributes, but has been deemed by the community to have low value contributions, a "Rebel" badge. Different badges can be created and the criteria for each badge changed, depending on what an administrator of a portal believes would encourage more valuable feedback to the portal. These badges can be displayed on the profiles of users who have obtained them.

Some specific flows for determining a technique of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figures 13, 14:
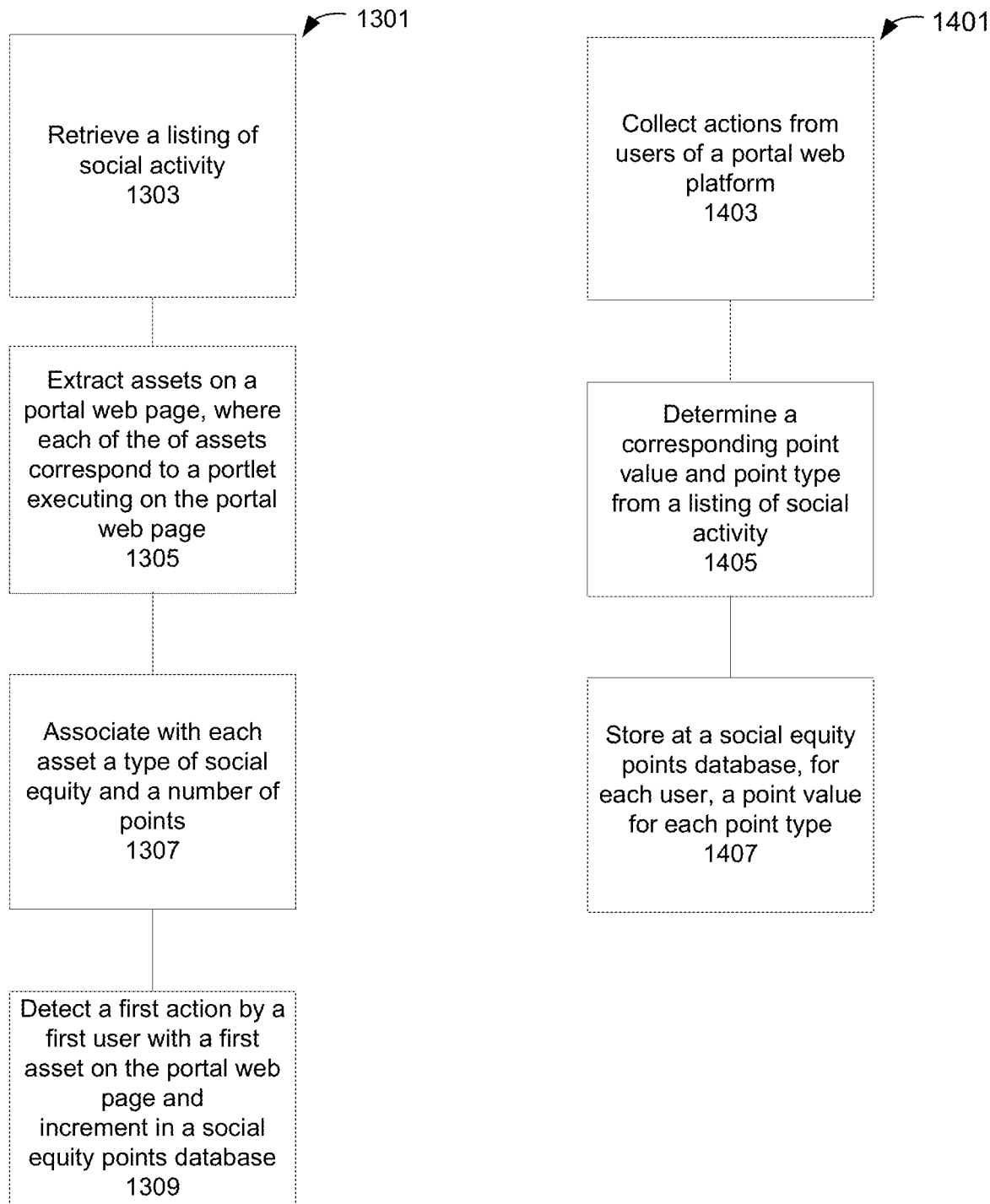
FIG. 13 shows a sample flow of the system.
FIG. 14 shows another sample flow of the system.

FIG. 13 shows a sample flow 1301 of the system. In a step 1303, the system retrieves a listing of social activity. The listing can include a listing of actions and attributes associated with each action, such as what kind of assets (e.g., blog, message board, wiki site) the action relates to, a type of social equity (e.g., popularity points, contribution points, participation points), and a number of points associated with the type of social equity. In a step 1305, the system extracts assets on a portal web page, where each of the assets corresponds to a portlet executing on the portal web page. In a step 1307, the system associates with each asset a type of social equity and a number of points. This can be done by processing the listing of social activity information retrieved in step 1303. In a step 1309, the system detects a first action by a first user with a first asset on the portal web page and increment in a social equity points database. For example, for a tracked asset of the system, the system can detect what action the first user has done. The tracked asset can be an asset generated by the first user. The social equity database can store the points of users in the system, according to each point type. In an implementation, the points of users in the system are reset (e.g., to zero, halved, or reduced) by an amount determined by the portal administrator.

FIG. 14 shows another sample flow 1401 of the system. In a step 1403, the system collects actions from users of a portal web platform. In a step 1405, the system determines a corresponding point value and point type from a listing of social activity. In a step 1407, the system stores at a social equity points database, for each user, a point value for each point type.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A method comprising:
providing a portal server executing portal software that allows an administrator to build at least one web site for users, wherein the portal software comprises a library of portlets;
allowing the administrator to build a portal web page for the web site by selecting at least a first portlet, wherein the first portlet comprises social collaboration tools that for each user of the users includes a set of user-specified connections, selected by the user to connect with using the social collaboration tools, and a set of organization-specified connections, selected by an organization the user is associated with based on at least one of the organization's structure or projects the user is involved with;

associating the first portlet to the portal web page, wherein the first portlet is accessible to users accessing the portal web page;
collecting a plurality of actions corresponding to the first portlet from a plurality of users of the web page of the portal web platform;
for each action of the plurality of actions corresponding to the first portlet, determining a corresponding point value and point type based on social activity tracking parameters specified by the administrator, wherein determining the point type comprises
determining whether each action corresponds to at least one point type from a set of point types comprising a participation point type for creating assets in the portal server, a contribution point type for actions performed on a created asset, and a popularity point type for viewership of a created asset; and
adjusting values stored in a social equity points database according to the determined corresponding point value and point type.

2. The method of claim 1 comprising:
generating a summary of values in the social equity points database.

3. The method of claim 2 wherein the summary is accessible by the plurality of users.

4. The method of claim 1 comprising:
after exceeding a threshold, resetting in the social equity points database the points associated with a user.

5. The method of claim 4 comprising:
before the resetting in the social equity points database, based on the parameters specified by the administrator for tracking of social activity, processing a plurality of threshold values for types of social equity.

6. The method of claim 4 wherein the threshold is a length of time.

7. The method of claim 4 wherein the threshold is a number of points.

8. The method of claim 4 wherein the resetting is to a zero point value.

9. The method of claim 4 wherein the resetting is to a non-zero point value.

10. The method of claim 1 wherein a number of points stored in the social equity points database is visible to a user.

11. The method of claim 1 wherein a number of points stored in the social equity points database is hidden from the user.

12. The method of claim 1 wherein the portal web page comprises an enterprise portal.

13. The method of claim 1 comprising processing the social equity points database to generate a leaderboard.

14. The method of claim 1 wherein the social collaboration tools allow adding a blog entry associated with a blog portlet.

15. The method of claim 1 wherein the social collaboration tools allow adding a wiki entry associated with a wiki portlet.

16. The method of claim 1 wherein the social collaboration tools allow adding a message board entry associated with a message board portlet.

17. The method of claim 1 wherein a type of social equity comprises at least one of contribution, participation, or popularity.

18. The method of claim 1 wherein the first portlet is a Java-standard portlet.

19. The method of claim 1 wherein the plurality of actions comprise information transmitted by the first portlet when collecting the plurality of actions.

20. The method of claim 1 wherein the point type corresponds to a feature provided by the first portlet.

21. The method of claim 1 wherein at least one action of the plurality of actions corresponds to at least one of logging in to the portal web page, time spent on the portal web page, contributing to a forum, asking or posting a question, answering a question, or maintaining and updating a blog.

22. The method of claim 1 wherein a user-specified connection for the user is allowed access to the user's data stored in a particular portlet.

23. The method of claim 22 wherein the particular portlet comprises a calendar portlet.

24. The method of claim 1 wherein the adjusting values stored in the social equity points database comprises disallowing accrual of point value based on whether a period of time has elapsed.

25. The method of claim 1 wherein the social collaboration tools comprise a standard container defining a social identity of users of the portal software.

26. The method of claim 1 comprising:
associating a second portlet to the portal web page, wherein the second portlet is accessible to users accessing the portal web page, wherein the first portlet comprises a first application and the second portlet comprises a second application.

27. The method of claim 26 wherein the first application and the second application are different applications.

28. The method of claim 26 wherein the first application and the second application comprise different application functionality.

29. The method of claim 1 wherein the first portlet comprises a calendar application.

30. The method of claim 1 wherein the first portlet comprises a blogging application.

31. The method of claim 1 wherein the first portlet provides access to an asset without a wrapper.

* * * * *